United States Patent
Ryu et al.

(10) Patent No.: US 12,454,318 B2
(45) Date of Patent: Oct. 28, 2025

(54) STRUCTURE FOR REINFORCING RIGIDITY OF QUARTER MEMBER

(71) Applicants: Hyundai Motor Company, Seoul (KR); Kia Corporation, Seoul (KR)

(72) Inventors: Jong Hyun Ryu, Yongin-si (KR); Eon Pyo Kim, Seoul (KR); Ji Woon Go, Pyeongtaek-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 327 days.

(21) Appl. No.: 18/075,556

(22) Filed: Dec. 6, 2022

(65) Prior Publication Data

US 2023/0211829 A1 Jul. 6, 2023

(30) Foreign Application Priority Data

Jan. 4, 2022 (KR) .......... 10-2022-0000890

(51) Int. Cl.
  *B62D 25/08* (2006.01)
  *B62D 25/02* (2006.01)
  *B62D 25/04* (2006.01)

(52) U.S. Cl.
  CPC .......... *B62D 25/088* (2013.01); *B62D 25/04* (2013.01); *B62D 25/087* (2013.01)

(58) Field of Classification Search
  CPC ...... B62D 25/08; B62D 25/088; B62D 25/04; B62D 25/087; B62D 25/00; B62D 25/02
  USPC ........ 296/203.01, 4, 183.08, 193.05, 29, 30, 296/193.08
  See application file for complete search history.

(56) References Cited

U.S. PATENT DOCUMENTS 11,548,560 B2 * 1/2023 Hara .................. B62D 31/02
11,919,374 B2 * 3/2024 Brenninger ............ B62D 65/06

FOREIGN PATENT DOCUMENTS

DE   102016104045 A1 * 10/2016 ............ B62D 25/02
KP   20210129376 A    10/2021

OTHER PUBLICATIONS

DE102016104045 Text (Year: 2016).*

* cited by examiner

*Primary Examiner* — Dennis H Pedder
(74) *Attorney, Agent, or Firm* — Slater Matsil, LLP (57) ABSTRACT

An embodiment structure for reinforcing rigidity of a quarter member includes a rear shock absorber member configured to position a rear shock absorber, a quarter vertical member extending from an upper end portion of the rear shock absorber member to an upper portion of a quarter glass pane, and a rear pillar member extending from the upper portion of the quarter glass pane up to a rear glass pane and overlapping a portion of the quarter vertical member.

10 Claims, 4 Drawing Sheets

SECTION A-A

STRUCTURE FOR REINFORCING RIGIDITY OF QUARTER MEMBER

CROSS-REFERENCE TO RELATED APPLICATIONS

This application claims the benefit of Korean Patent Application No. 10-2022-0000890, filed on Jan. 4, 2022, which application is hereby incorporated herein by reference.

TECHNICAL FIELD

The present disclosure relates to a structure for reinforcing the rigidity of a quarter member.

BACKGROUND

In recent years, with an improvement in performance of motive power of an engine, there has been an overwhelming demand for vehicles suitable for sufficiently securing the rigidity of a vehicle frame in order to securely maintain a living space for an occupant while stably supporting a motive power system having an improved output.

The rigidity of the vehicle frame can be broadly categorized into two types: stationary rigidity and dynamic rigidity. Particularly, the dynamic rigidity is more important because of its direct association with a feeling that a driver experiences during vehicle traveling. Research has been actively conducted on the dynamic rigidity of the vehicle frame. The research has shown that a structure of the vehicle frame has a greater influence on the dynamic rigidity than a thickness or material of each component that constitutes the vehicle frame. Particularly, due to its structural feature, a so-called T-joint portion that occurs in an opening portion in which front and rear roof rails of the vehicle frame, front and rear glass panes, and the like are mounted tends to have so much influence on the dynamic rigidity of the vehicle.

A quarter upper portion of a rear lateral surface of the vehicle on which a rear glass pane is mounted includes the T-joint portion as mentioned above and is one of the portions having so much influence on the dynamic rigidity of the vehicle. A rear pillar that constitutes the rear side of the vehicle is positioned in the quarter upper portion, and a quarter fixed glass pane is positioned between a vertical member and the rear pillar. A surface of an upper end portion of the package tray side extending from a surface of an upper end portion of a package tray center portion has a linearized shape and connects left and right quarters and a package tray to each other, and a bulk head for reinforcing cross-sectional rigidity is added in a cross section of the package tray side.

In this case, respective cross sections of the rear pillar and the vertical member are separated from each other, and thus the connectivity thereof is weak. For this reason, there occurs a problem in securing the rigidity of a rear portion. The dedicated electric vehicle refers to a coupe-type Crossover Utility Vehicle (CUV) based on an Electric-Global Modular Platform (E-GMP) that is a dedicated platform. There is a problem in that a linearized package tray cannot support a design of a quarter fixed glass pane directed more downward than a surface of an upper end portion of a package tray of this type of dedicated electric vehicle.

Korean Patent Application Publication No. 10-2021-0129376 may provide information related to the technology of embodiments of the present disclosure.

SUMMARY

The present disclosure relates to a structure for reinforcing the rigidity of a quarter member. Particular embodiments relate to a structure for reinforcing the rigidity of a quarter member, the structure being capable of being employed for a design of a fixed glass pane of a type of dedicated electric vehicle through the use of a package tray side on which a downward-extending portion is formed, with the rigidity of the structure being secured by connection between a quarter vertical member and a rear pillar member.

An embodiment of the present disclosure, which may solve problems in the art, provides a structure for reinforcing the rigidity of a quarter member, the structure being capable of securing the rigidity of a quarter member using at least overlapping portions of a quarter vertical member and a rear pillar member.

Another embodiment of the present disclosure provides a structure for reinforcing the rigidity of a quarter member, the structure being capable of being employed for a design of a fixed glass pane of a type of dedicated electric vehicle through the use of a package tray side on which a downward-extending portion is formed.

Embodiments of the present disclosure are not limited to the above-mentioned embodiment. Embodiments other than the above-mentioned embodiments would be clearly understood from the following description of exemplary embodiments of the present disclosure. In addition, embodiments of the present disclosure will be accomplished by limitations recited in claims or a combination thereof.

In order to accomplish the embodiments of the present disclosure, the structure for reinforcing the rigidity of a quarter member is configured as follows.

According to an embodiment of the present disclosure, there is provided a structure for reinforcing the rigidity of a quarter member, the structure including a rear shock absorber member configured to position a rear shock absorber, a quarter vertical member extending from an upper end portion of the rear shock absorber member to an upper portion of a quarter glass pane, a rear pillar member extending from an upper portion of the quarter glass pane up to a rear glass pane and formed to overlap at least one portion of the quarter vertical member, and a package tray side connected to one end portion of the rear shock absorber and one end portion of the quarter vertical member and including a downward-extending portion extending downward toward the outside of a vehicle.

The structure may further include a bulk head unit formed on the downward-extending portion.

In the structure, the bulk head unit may include a first region extending from a bottom surface of the package tray side up to one end portion of an upper portion of the downward-extending portion and configured to be fastened to the package side tray, a second region configured to be adjacent to the first region, to extend from the bottom surface of the package tray side up to an upper end portion of the downward-extending portion, and to be fastened to the package side tray, and a third region formed in a manner that is connected to the second region and extends along the downward-extending portion and configured in such a manner as to be fastened to upper end portions of the package side tray and a wheel house, wherein the first region and the second region have a "V-shaped" cross section when connected to each other and the second region and the third region have an "inverted V-shaped" cross section when connected to each other.

In the structure, the second region and the third region may be configured to be integrated into one piece.

In the structure, the quarter vertical member may be configured in such a manner as to have at least one portion thereof overlapping the rear pillar member and thus to have a closed cross section when combined with a quarter inner panel.

The structure may further include a first flange portion with which a rear surface of the package tray side and a front surface of the rear shock absorber member are flange-fastened to each other, and a second flange portion with which the rear surface of the package tray side and a front surface of the quarter vertical member are flange-fastened to each other.

According to embodiments of the present disclosure, the following advantageous effects can be achieved according to the above-mentioned embodiments of the present disclosure and with constituent elements, a combination thereof, and an application-based relationship therebetween that will be described below.

An advantageous effect of securing the rigidity through the use of at least overlapping portions of the quarter vertical member and the rear pillar member and distributing an input load on a chassis portion by forming the second flange portion can be achieved.

In addition, there can be provided the structure for reinforcing the rigidity of a quarter member, the structure being capable of being employed for a design of a fixed glass pane of a type of dedicated electric vehicle through the use of the package tray side on which the downward-extending portion is formed.

BRIEF DESCRIPTION OF THE DRAWINGS

The above and other features of embodiments of the present disclosure will now be described in detail with reference to certain exemplary examples thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of the present disclosure throughout the several figures of the drawings.

DETAILED DESCRIPTION OF ILLUSTRATIVE EMBODIMENTS

Embodiments of the present disclosure will be described in more detail below with reference to the accompanying drawings. The embodiments of the present disclosure will be modified in various forms, and the scope of the present disclosure should not be interpreted as being limited to the following embodiments. The embodiments are described in sufficient detail to enable a person of ordinary skill in the art to make and use the present disclosure.

The term "unit," "member," or the like, which is used through the specification, means a component that performs at least one function or operation and may be realized as a hardware component or a combination of hardware components.

In addition, throughout the present specification, the terms "upper end" and "lower end" are defined with respect to the height direction on the drawings.

In addition, in order to distinguish among constituent elements that have the same name, the terms first, second, and so on are used throughout the present specification. In the following description, no limitation to the order of the terms is necessarily imposed.

In addition, throughout the present specification, the "height direction," "widthwise direction," and "lengthwise direction" are defined with respect to a vehicle.

In addition, throughout the present specification, the term "outside" means an area adjacent to and beyond the outer side in the widthwise direction of the vehicle.

In addition, throughout the present specification, when a component is "over" a different component, this means that a third component may be positioned therebetween, and when a component is "on the top of" a different component, this means that the component is vertically in contact with an upper surface of the different component. Furthermore, throughout the present specification, when a component is "under" a different component, this means that a third component may be positioned therebetween, and when a component is "on the bottom of" a different component, this means that the component is vertically in contact with a lower surface of the different component.

Figure 1:
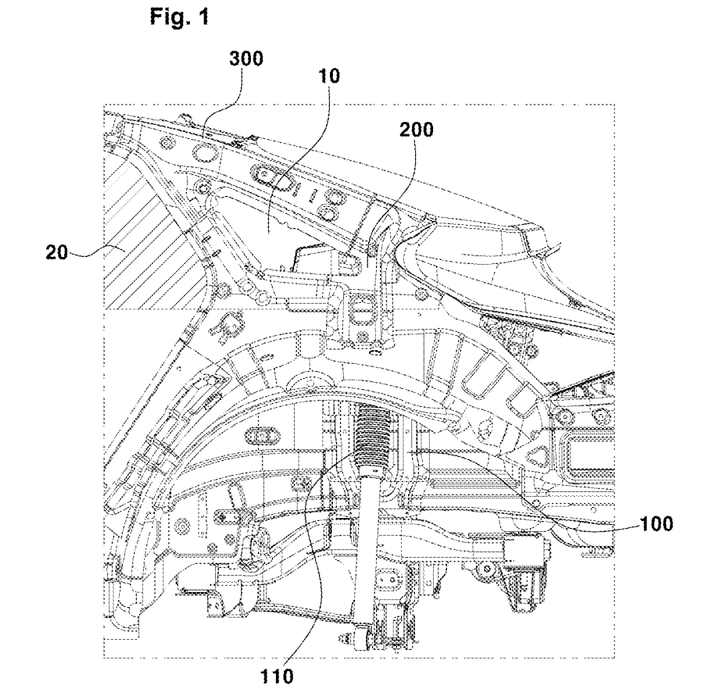
FIG. 1 is a vertical cross-sectional view illustrating a structure for reinforcing the rigidity of a quarter member according to an embodiment of the present disclosure.

FIG. 1 is a vertical cross-sectional view illustrating a structure for reinforcing the rigidity of a quarter member according to an embodiment of the present disclosure.

With reference to FIG. 1, the structure for reinforcing the rigidity of a quarter member according to an embodiment of the present disclosure may be configured to include a rear shock absorber member 100, a quarter vertical member 200, a rear pillar member 300, and a package tray side 400.

The rear shock absorber member 100 is configured to position a rear shock absorber 110 of a vehicle. The rear shock absorber 110 may be configured in such a manner as to absorb an input load on a rear wheel tire and to transfer the absorbed input load to a vehicle frame. The rear shock absorber 110 may be fastened to the rear shock absorber member 100 fixed on the vehicle frame.

The rear shock absorber member 100 may be configured in such a manner as to be positioned outside a wheel house of the vehicle, so that the rear shock absorber 110 is fastened on the top of the rear shock absorber member 100. As an implementation example, the rear shock absorber member 100 may include a fastening hole formed therein in such a manner that the rear shock absorber no is fastened thereon.

The quarter vertical member 200 extends from an upper end portion of the rear shock absorber member 100 to an upper portion of a quarter glass pane 10. More preferably, the quarter vertical member 200 may be configured in such a manner as to be positioned on the upper end portion of the rear shock absorber member 100, so that the load that is input through the rear shock absorber no is transferred to an upper body of the vehicle. The quarter vertical member 200 may be formed in a manner that extends from a lateral surface of the quarter glass pane 10 up to one end of the upper portion thereof.

The rear pillar member 300 extends from an upper portion of the quarter glass pane 10 up to a rear glass pane 20 and is formed to overlap at least one portion of the quarter vertical member 200. More preferably, the rear pillar member 300 may be formed in a manner that extends forward in the lengthwise direction from the one end of the upper portion of the quarter glass pane 10 up to one end of an upper portion of the rear glass pane 20. The quarter glass pane 10 may be positioned more rearward in the lengthwise direction than the rear glass pane 20.

The rear pillar member 300 may be formed in such a manner that at least one portion thereof overlaps the quarter vertical member 200. More specifically, at least one portion of the rear pillar member 300 may overlap the quarter vertical member 200 in the lengthwise direction at the upper portion of the quarter glass pane 10. The rear pillar member 300 is configured in such a manner that at least one portion thereof overlaps at least one portion of the quarter vertical member 200 at the upper portion of the quarter glass pane 10. Thus, the continuity of a cross section of a vehicle-frame structure can be secured.

The package tray side 400 may be configured in such a manner as to be connected to one end portion of the rear shock absorber member 100 and one end portion of the quarter vertical member 200. The package tray side 400 may be an intermediate member connecting a package tray and a quarter unit to each other. The package tray side 400 may be a bone structure positioned inside the quarter unit. The package tray sides 400 in a pair may be formed on opposite sides, respectively, of the package tray. The package tray may be a transverse member connecting the package tray sides 400 in a pair to each other.

The package tray side 400 may be configured to include a downward-extending portion 410 that extends downward toward the outside of the vehicle. As an implementation example, the package tray side 400 may be configured in such a manner that, in a one-curve design of a type of dedicated electric vehicle, the inclusion of the downward-extending portion 410 realizes a design of the quarter glass pane 10 directed more downward than a surface of the upper end portion of the package tray. The package tray side 400 may be formed in such a manner that a surface of an upper end portion thereof extends more downward in the height direction than a surface of an upper end portion of the package tray.

A bulk head unit 420 may be formed on the downward-extending portion 410. More preferably, the downward-extending portion 410 may be configured to enhance the rigidity of a cross section of the package tray side 400. As an implementation example, in order to resist an increased input load on a rear chassis portion of a rear-wheel-drive electric vehicle, the downward-extending portion 410 may be configured in such a manner as to secure the rigidity of a rear portion and improve the durability thereof.

Figure 2:
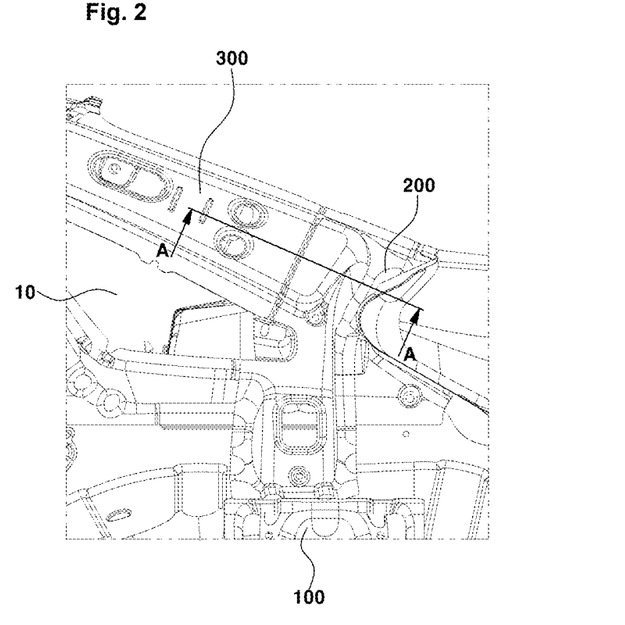
FIG. 2 is a view illustrating a region of the structure for reinforcing the rigidity of a quarter member according to an embodiment of the present disclosure where a quarter vertical member and a rear pillar member overlap.
Figure 3:
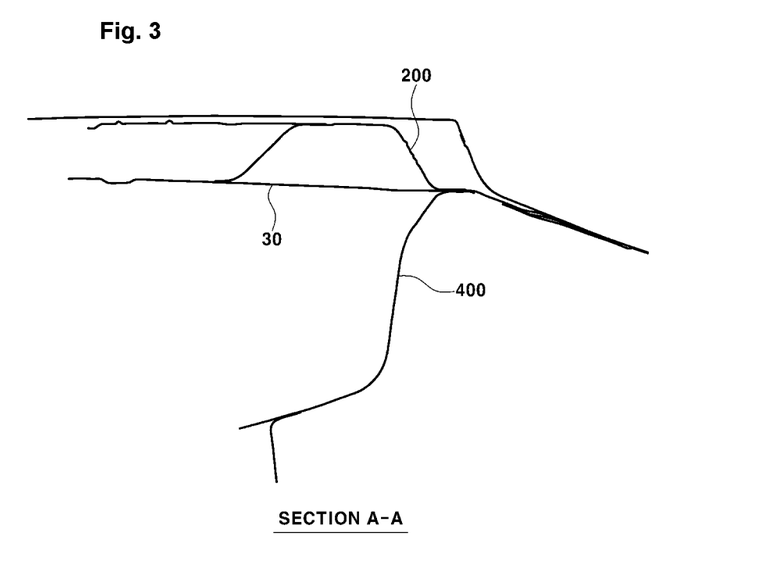
FIG. 3 is a cross-sectional view taken along line A-A on the structure for reinforcing the rigidity of a quarter member according to an embodiment of the present disclosure in FIG. 2.

FIG. 2 is a view illustrating a region of the structure for reinforcing the rigidity of a quarter member according to an embodiment of the present disclosure where the quarter vertical member 200 and the rear pillar member 300 overlap. FIG. 3 is a cross-sectional view taken along line A-A on the structure for reinforcing the rigidity of a quarter member according to an embodiment of the present disclosure in FIG. 2.

With reference to FIGS. 2 and 3, the quarter vertical member 200 may be configured in such a manner as to have at least one portion thereof overlapping the rear pillar member 300 and thus to have a closed cross section when combined with a quarter inner panel 30. More preferably, the quarter vertical member 200 may be fastened, through a combination end portion, to the quarter inner panel 30. The rear pillar member 300 may be combined with the quarter inner panel 30 of a rear quarter unit.

The quarter vertical member 200 may be configured in such a manner that a portion thereof overlaps the rear pillar member 300. Thus, the quarter vertical member 200 may be configured in such a manner as to have a closed cross section when combined with the quarter inner panel 30. The closed cross section of the overlapping portions of the quarter vertical member 200 and the rear pillar member 300 may serve as a reinforcement for the rear pillar member 300.

The quarter vertical member 200 may be formed in a manner that extends in the height direction so that a lower end portion thereof is positioned on an upper portion of the rear shock absorber member 100 and so that an upper end portion thereof is positioned on the upper portion of the quarter glass pane 10. More preferably, the quarter vertical member 200 may extend along a left surface of the quarter glass pane 10 in FIG. 2 from the upper portion of the rear shock absorber member 100.

The rear pillar member 300 may be formed in such a manner that it extends from a part, overlapping at least one portion of the rear pillar member 300, of the quarter vertical member 200 along the left surface of the quarter glass pane 10 in FIG. 2 up to one end portion of the rear glass pane 20. According to an embodiment of the present disclosure, the rear pillar member 300 and the quarter vertical member 200 are connected to each other in an overlapping manner. That is, the rear pillar member 300 and the quarter vertical member 200 are configured in such a manner as to secure the rigidity of a rear portion of the vehicle frame. In addition, the quarter vertical member 200 is positioned adjacent to the upper portion of the rear shock absorber member 100. That is, the quarter vertical member 200 is configured in such a manner as to facilitate transfer of the load that is input through the rear shock absorber no.

Figure 4:
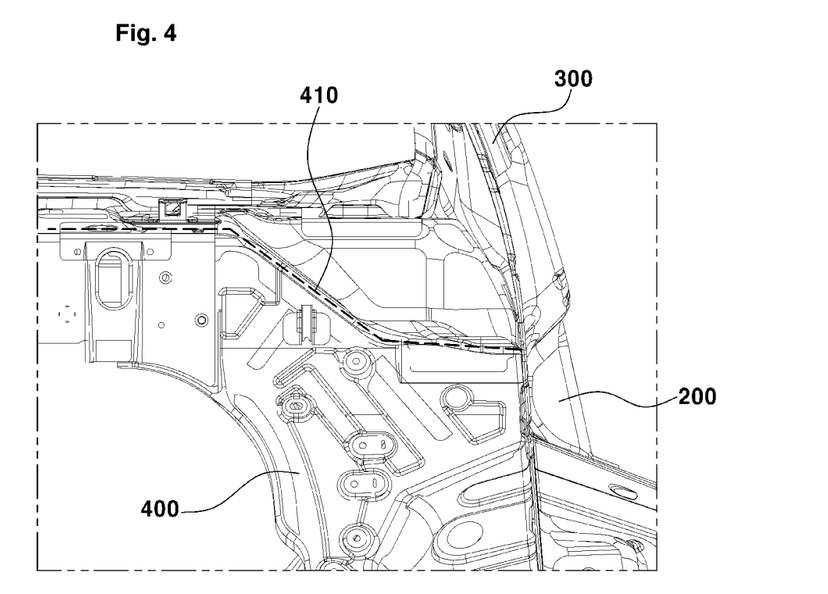
FIG. 4 is a front view illustrating a downward-extending portion of a package tray side of the structure for reinforcing the rigidity of a quarter member according to an embodiment of the present disclosure.

FIG. 4 is a front view illustrating the downward-extending portion 410 of the package tray side 400 of the structure for reinforcing the rigidity of a quarter member according to an embodiment of the present disclosure.

With reference to FIG. 4, the structure for reinforcing the rigidity of a quarter member according to an embodiment of the present disclosure may be configured in such a manner as to further include the bulk head unit 420 to be formed on the downward-extending portion 410. The downward-extending portion 410 may be formed on the surface of the upper end portion of the package tray side 400.

More specifically, the downward-extending portion 410 may be formed in a manner that extends downward from inside to outside in the widthwise direction along the surface of the upper end portion of the package tray side 400. The package tray side 400 is configured in such a manner as to include the downward-extending portion 410. Thus, the package tray side 400 may be configured in such a manner as to be used in the case of a design in which the quarter glass pane 10 is directed downward.

The bulk head unit 420 may be configured in such a manner as to be formed on the downward-extending portion 410 and thus to serve as a member reinforcing the rigidity of the package tray side 400. That is, the bulk head unit 420 may be a rigidity reinforcing member that is positioned on the package tray side 400 and resists twisting of the vehicle frame.

Figure 5:
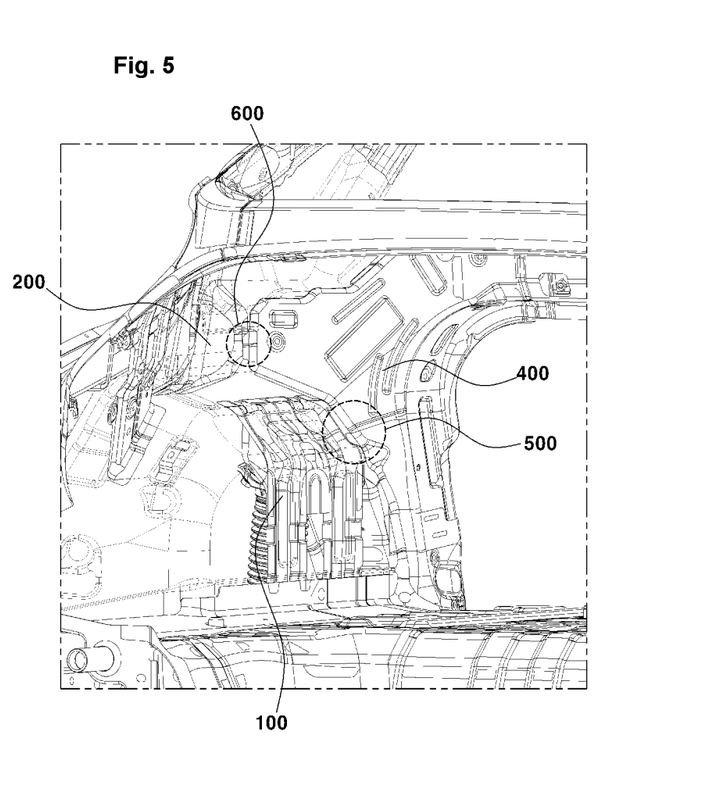
FIG. 5 is a rear view illustrating a first flange portion and a second flange portion of the structure for reinforcing the rigidity of a quarter member according to an embodiment of the present disclosure.

FIG. 5 is a rear view illustrating a first flange portion 500 and a second flange portion 600 of the structure for reinforcing the rigidity of a quarter member according to an embodiment of the present disclosure.

With reference to FIG. 5, the structure for reinforcing the rigidity of a quarter member according to an embodiment of the present disclosure may be configured to further include the first flange portion 500 and the second flange portion 600. More preferably, the first flange portion 500 may be configured in such a manner that a rear surface of the package tray side 400 and a front surface of the rear shock absorber member 100 are flange-fastened to each other. The second flange portion 600 may be configured in such a manner that the rear surface of the package tray side 400 and a front surface of the quarter vertical member 200 are flange-fastened to each other.

More preferably, the first flange portion 500 may be configured in such a manner that one end portion of the rear surface of the package tray side 400 and one end portion of the front surface of the rear shock absorber member 100 are connected to each other, so that the load that is input through the rear shock absorber no is transferred in the transverse direction of the vehicle frame through the package tray side 400.

The second flange portion 600 may be configured in such a manner that the one end portion of the rear surface of the package tray side 400 and one end portion of the front surface of the quarter vertical member 200 are connected to each other, so that the load that is input through the rear shock absorber 110 is transferred along the quarter vertical member 200 in the height direction up to the rear pillar member 300.

Figure 6:
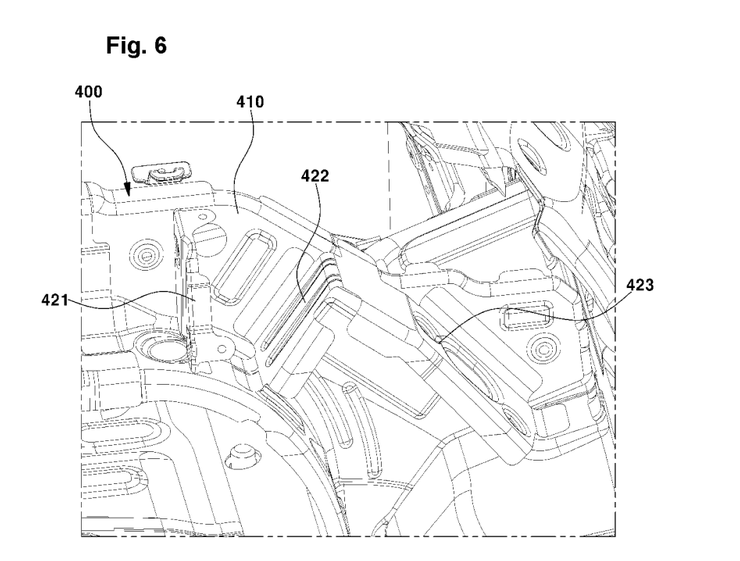
FIG. 6 is a view illustrating a bulk head unit of the structure for reinforcing the rigidity of a quarter member according to an embodiment of the present disclosure.

FIG. 6 is a view illustrating the bulk head unit 420 of the structure for reinforcing the rigidity of a quarter member according to an embodiment of the present disclosure.

With reference to FIG. 6, the bulk head unit 420 may be configured in such a manner as to include a first region 421, a second region 422, and a third region 423. More specifically, the first region 421 may be formed in a manner that extends from a bottom surface of the package tray side 400 to one end portion of an upper portion of the downward-extending portion 410. The first region 421 may be configured in such a manner as to be fastened to the package tray side 400.

The first region 421 may be formed in a manner that extends in the height direction from the bottom surface of the package tray side 400 to an upper surface thereof. As an implementation example, the first region 421 may be flange-fastened, through a combination end portion, to a front surface, the rear surface, the upper surface, and the bottom surface of the package tray side 400 for being fixed thereto.

As an implementation example, the second region 422 and the third region 423 may be configured to be integrated into one piece. The second region 422 may be formed in a manner that is adjacent to the first region 421 and extends from the bottom surface of the package tray side 400 up to an upper end portion of the downward-extending portion 410. The second region 422 may be configured in such a manner as to be fastened to the package tray side 400.

The second region 422 may be formed in a manner that extends in the height direction from the bottom surface of the package tray side 400 to the upper surface thereof. As an implementation example, the second region 422 may be flange-fastened, through a combination end portion, to the front surface, the rear surface, and the bottom surface of the package tray side 400 for being fixed thereto.

The third region 423 may be formed in a manner that is connected to the second region 422 and extends along the downward-extending portion 410. The third region 423 may be configured in such a manner as to be fastened to upper end portions of the package tray side 400 and the wheel house. More specifically, the third region 423 may be formed in a manner that is connected to an upper portion of the second region 422 and extends outward toward the downward-extending portion 410 therefrom. As an implementation example, the third region 423 may be flange-fastened, through a combination end portion, to the front surface and the rear surface of the package tray side 400 and the upper end portion of the wheel house for being fixed thereto.

The first region 421 and the second region 422 may be configured to have a V-shaped cross section when connected to each other. As an implementation example, the first region 421 and the second region 422 may be formed to be inclined inward and outward, respectively, in the widthwise direction. Thus, the first region 421 and the second region 422 have a "V-shaped" cross section when viewed from the front. The first region 421 and the second region 422 may be configured to have a V-shaped cross section when connected to each other. Thus, the bottom surface of the package tray side 400, the surface of the upper end portion thereof, and an inclined surface of the downward-extending portion 410 may be connected to each other. Accordingly, the package tray side 400 may be configured in such a manner that the rigidity thereof is secured through the cross section thereof.

The second region 422 and the third region 423 may be configured to have an inverted V-shaped cross section when connected to each other. As an implementation example, the second region 422 may be configured in such a manner that a lower end portion thereof is positioned on the bottom surface of the package tray side 400 and that an upper end portion thereof is inclined outward toward the surface of the upper end portion of the package tray side 400. The third region 423 may be formed in such a manner that one end portion thereof is connected to an upper end portion of the second region 422 and extends along the downward-extending portion 410. The third region 423 may be formed to extend in such a manner that the other end portion thereof is positioned on the wheel house.

Figure 7:
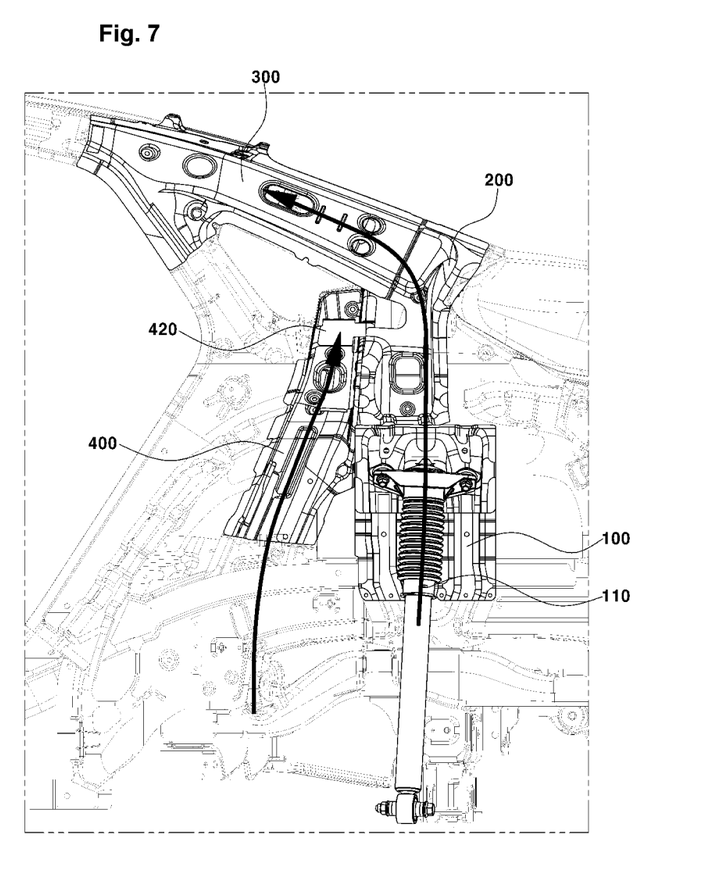
FIG. 7 is a view illustrating a distribution of a load that is input through a rear shock absorber of the structure for reinforcing the rigidity of a quarter member according to an embodiment of the present disclosure.

FIG. 7 is a view illustrating a distribution of the load that is input through the rear shock absorber 110 of the structure for reinforcing the rigidity of a quarter member according to an embodiment of the present disclosure.

With reference to FIG. 7, the structure for reinforcing the rigidity of a quarter member according to an embodiment of the present disclosure may be configured in such a manner that the load that is input through the rear shock absorber 110 is distributed toward two directions in a split manner. More preferably, the load that is input through the rear shock absorber no may be transferred through the rear shock absorber member 100 to the package tray side 400 and then may be transferred toward the widthwise direction of the vehicle frame. In addition, the load that is input through the rear shock absorber no may be transferred through the rear shock absorber member 100 to the quarter vertical member 200 and then may be transferred toward the height direction of the vehicle frame.

More specifically, the structure for reinforcing the rigidity of a quarter member according to embodiments of the present disclosure may be configured in such a manner that the load that is input through the rear shock absorber no is transferred by the first flange portion 500 through the package tray side 400 toward the transverse direction of the vehicle frame. In addition, the structure for reinforcing the rigidity of a quarter member according to embodiments of the present disclosure may be configured in such a manner that the load that is input through the rear shock absorber 110 is transferred through the second flange portion 600 toward the height direction.

The package tray side 400 may be configured in such a manner that the rigidity thereof is reinforced with the bulk head unit 420 and thus can serve as a reinforcement member that transfers the load that is input to the vehicle frame toward the transverse direction and resists the twisting of the vehicle frame. The quarter vertical member 200 may be configured in such a manner as to serve as the reinforcement member that transfers through the second flange portion 600 to an upper body the load that is input to the vehicle frame and resists the twisting by forming a ring-shaped structure of the rear portion of the vehicle frame.

In summary, according to embodiments of the present disclosure, there is provided the structure for reinforcing the rigidity of a quarter member, which is capable of distributing the load that is input through the rear shock absorber 110 and of securing the rigidity to resist the twisting of the vehicle frame and improving the durability thereof by fastening the members of the rear portion of the vehicle frame to each other.

The detailed description provided above are an exemplary description. In addition, the embodiments of the present disclosure are described above as ones in the desired form, and various different combinations of and various different modifications to the embodiments of the present disclosure would be made under various conditions. A modification or alteration to the embodiments, as disclosed in the present specification, of the present disclosure would be made within the scope of the concept of the present disclosure, the scope of equivalents of the disclosed contents, and/or the scope of the technology or knowledge in the art. The embodiments are described above to provide features for realizing the technical idea of the present disclosure, and various modifications, which are required in a particular technical field in which the present disclosure finds application and are required to use the present disclosure, may also be made to the embodiments. Therefore, the embodiments, as disclosed in detail above, of the present disclosure are not intended to impose any limitation to the present disclosure. In addition, the following claims should be construed as covering other embodiments as well.

What is claimed is:

1. A structure for reinforcing rigidity of a quarter member, the structure comprising:
a rear shock absorber member configured to position a rear shock absorber;
a quarter vertical member extending from an upper end portion of the rear shock absorber member to an upper portion of a quarter glass pane;
a rear pillar member extending from the upper portion of the quarter glass pane up to a rear glass pane and overlapping a portion of the quarter vertical member;
a package tray side connected to a first end portion of the rear shock absorber member and a first end portion of the quarter vertical member, wherein the package tray side includes a downward-extending portion that extends downward toward an outside of a vehicle; and
a bulk head device provided on the downward-extending portion and including multiple regions.

2. The structure of claim 1, wherein the bulk head device comprises a first region extending from a bottom surface of the package tray side up to a first end portion of an upper portion of the downward-extending portion, wherein the first region is fastened to the package tray side.

3. The structure of claim 2, wherein the bulk head device further comprises:
a second region adjacent to the first region, extending from the bottom surface of the package tray side up to an upper end portion of the downward-extending portion, and fastened to the package tray side; and
a third region connected to the second region and extending along the downward-extending portion, wherein the third region is fastened to upper end portions of the package tray side and a wheel house.

4. The structure of claim 3, wherein the first region and the second region have a V-shaped cross section when connected to each other, and the second region and the third region have an inverted V-shaped cross section when connected to each other.

5. The structure of claim 4, wherein the second region and the third region are integrated into one piece.

6. The structure of claim 1, wherein a portion of the quarter vertical member overlaps the rear pillar member and has a closed cross section when combined with a quarter inner panel.

7. A vehicle body comprising:
a quarter member;
a rear shock absorber member;
a rear shock absorber positioned by the rear shock absorber member;
a quarter glass pane;
a quarter vertical member extending from an upper end portion of the rear shock absorber member to an upper portion of the quarter glass pane;
a quarter inner panel;
a rear pillar member extending from the upper portion of the quarter glass pane up to a rear glass pane and overlapping a portion of the quarter vertical member, wherein the portion of the quarter vertical member has a closed cross section when combined with the quarter inner panel;
a package tray side connected to a first end portion of the rear shock absorber member and a first end portion of the quarter vertical member and including a downward-extending portion that extends downward toward an outside of the vehicle body; and
a bulk head device provided on the downward-extending portion and including multiple regions.

8. The vehicle body of claim 7, wherein the bulk head device comprises a first region extending from a bottom surface of the package tray side up to a first end portion of an upper portion of the downward-extending portion, wherein the first region is fastened to the package tray side.

9. The vehicle body of claim 8, wherein the bulk head device further comprises:

a second region adjacent to the first region, extending from the bottom surface of the package tray side up to an upper end portion of the downward-extending portion, and fastened to the package tray side; and a third region connected to the second region and extending along the downward-extending portion, wherein the third region is fastened to upper end portions of the package tray side and a wheel house; and wherein the first region and the second region have a V-shaped cross section when connected to each other, and the second region and the third region have an inverted V-shaped cross section when connected to each other.

10. The vehicle body of claim 9, wherein the second region and the third region are integrated into one piece.

* * * * *